Dec. 9, 1958   D. C. BRATER ET AL   2,863,735
SYSTEM FOR CONVERSION OF UF$_4$ TO UF$_6$
Filed Feb. 19, 1954
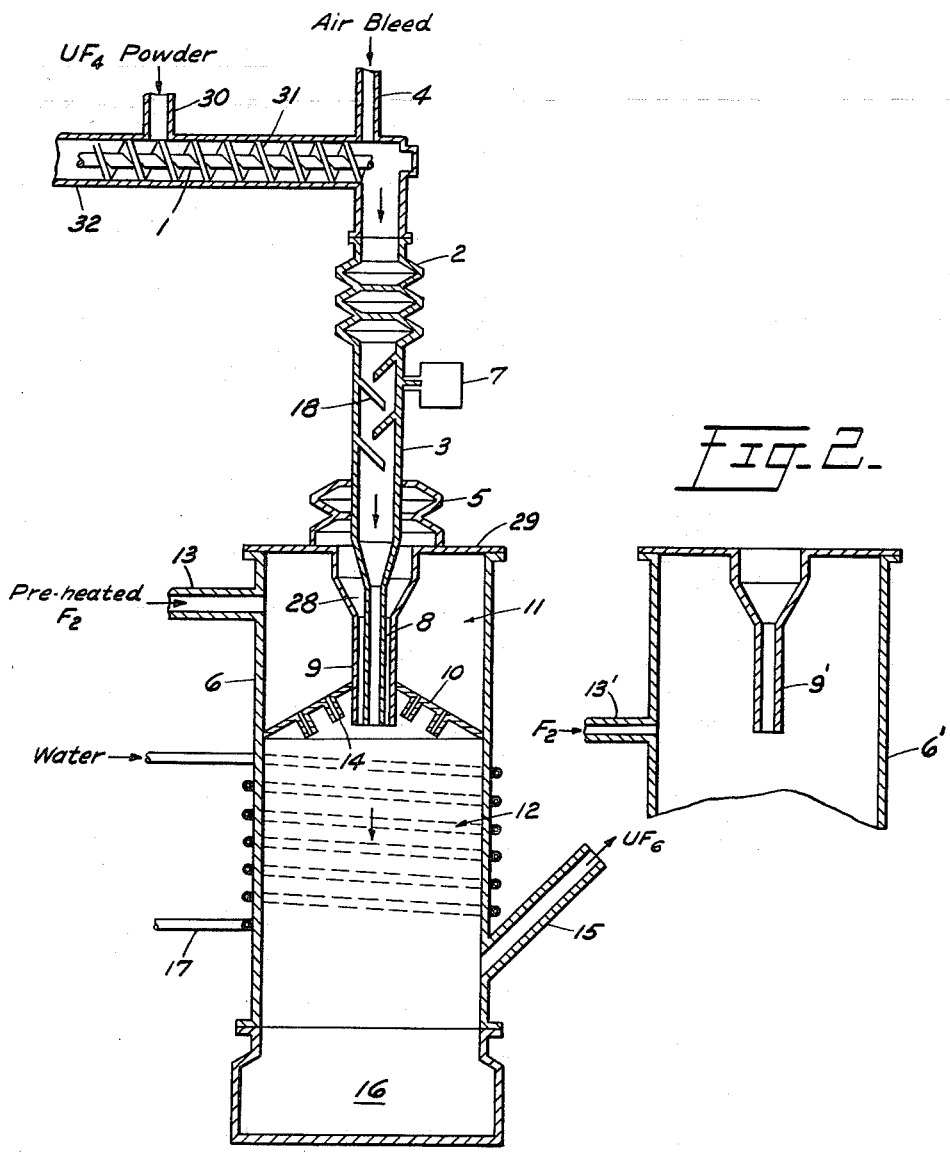
INVENTORS
Donald C. Brater
BY John W. Pike
ATTORNEY

United States Patent Office 2,863,735
Patented Dec. 9, 1958

2,863,735

SYSTEM FOR CONVERSION OF $UF_4$ TO $UF_6$

Donald C. Brater, Oak Ridge, Tenn., and John W. Pike, Chicago, Ill., assignors to the United States of America as represented by the United States Atomic Energy Commission Application February 19, 1954, Serial No. 411,592

1 Claim. (Cl. 23—252)

This invention relates to the conversion of $UF_4$ to $UF_6$, and more particularly to an improved method and apparatus for almost instantaneously and substantially completely reacting gaseous fluorine with dispersed $UF_4$ in the solid state to produce $UF_6$.

Heretofore, in the prior art, it has been the practice to convert $UF_4$ to $UF_6$ by forming a bed of $UF_4$ in the solid state, heating it, and passing $F_2$ in the gaseous phase over the surface of the bed to react them. Since this is an exothermic reaction attended by the liberation of large amounts of heat, the bed of $UF_4$ tends to fuse, and sintering and caking of the solid takes place. In addition, under some conditions of temperature and $UF_6$ concentration, low melting intermediate compounds are formed. Due to the thickness of the bed and the retarding effect of the caking and sintering, which interferred with the contacting of $UF_4$ with $F_2$, hours were required to carry out the reaction to completion at the operating temperatures. Further, due to the type of reactor and other equipment employed for this purpose, operating temperatures were required to be kept reasonably low in order to offer such equipment the necessary protection and prevent damage or destruction. With this arrangement the process could only be carried on as a batch process, so that the operator in charging uranium powders into the reactor over the radioactive ash and in removing the highly radioactive residue was subjected to radiation hazards, unless adequate protective facilities in the form of shielding and expensive handling equipment were provided. Efforts have been made to meet some of these problems by agitating the $UF_4$ with paddles, by rotating the reactor, and by using vibrating trays containing the $UF_4$. The rotating reactor raised difficult sealing problems and required the use of relatively low temperatures to protect equipment. While the vibrating tray system could be adapted to continuous feeding, it was necessarily restricted to thin layers of $UF_4$ on the trays. This necessitated a small feed and resulted in a system of limited capacity. The trays were vibrated at high frequencies and large complicated and expensive power transmission equipment was necessary to withstand the resulting stresses. However, such equipment could not withstand high temperatures (greater than 1100° F.) and limited the operation to lower temperatures which resulted in slower conversion of the $UF_4$ to $UF_6$, and, therefore, lowered operating efficiencies.

Applicants with a knowledge of these problems of the prior art have for an object of their invention the provision of a system and method for contacting gaseous $F_2$ with finely divided $UF_4$ to convert it to $UF_6$.

Applicants have as another object of their invention the provision of a method and apparatus for preheating $F_2$ to the optimum temperature and contacting it with $UF_4$ to increase the conversion of $UF_4$ to $UF_6$.

Applicants have as another object of their invention the provision of a method and apparatus for dispersing finely divided $UF_4$ in the solid state and burning it in gaseous $F_2$ to produce an almost instantaneous reaction of the fluorine with the $UF_4$ to convert it to $UF_6$.

Applicants have as a further object of their invention the provision of a method and apparatus for releasing finely divided $UF_4$ in a reactor tower where expensive and complicated handling equipment may be eliminated, and where the reaction may be carried out at higher temperatures.

Applicants have as a further object of their invention the provision of a method and apparatus for treating dispersed $UF_4$ with $F_2$ wherein air or other gas is employed in the system to prevent $F_2$ from reaching the $UF_4$ and causing such material to cake before the $UF_4$ has been dispersed.

Applicants have as a further object of their invention the provision of a method and apparatus for dispersing finely divided $UF_4$ and burning it with gaseous $F_2$ in a tower which serves to confine the reaction to a relatively small space permitting intimate mixing of the gas with the powder, and thereby limiting the excess of $F_2$ necessary to carry out the reaction.

Applicants have as a still further object of their invention the provision of a method and an apparatus for burning $UF_4$ and $F_2$ in a flame in a reaction tower where such high temperatures may be attained that conversion of $UF_4$ to $UF_6$ may be carried out almost instantaneously.

Applicants have as a still further object of their invention the provision of a system for converting $UF_4$ to $UF_6$ wherein the reaction tower may be of minimum size commensurate with meeting the heat dissipation requirements of the reaction.

Other objects and advantages of our invention will appear in the following specification and accompanying drawings, and the novel features thereof will be particularly pointed out in the annexed claim.

In the drawings, Fig. 1 is a longitudinal elevation, partly in section, of a portion of the apparatus of our improved system for converting $UF_4$ to $UF_6$.

Fig. 2 is a fragmental elevation, in section, of a modified reactor tower for carrying out our improved method for conversion of $UF_4$ to $UF_6$.

Referring to the drawings in detail, 1 designates a conventional screw-type of conveyor wherein helical screw 31 is rotated in the outer conveyor housing 32, and $UF_4$ in the solid phase, preferably in powdered form, is fed into inlet 30 and is carried by the screw 31 to the end of the conveyor where it falls into feed pipe 3. Air or other suitable gas is preferably continuously fed into the conveyor 1 through bleed line 4. This air travels down feed line 3 to the reactor.

The feed pipe 3 is provided with a plurality of internal baffles 18, to break up lumps of powder and its outlet end is connected through a bellows 5 to the top of a vertical reactor 6. A vibrator 7, which may be of any suitable, conventional type, is provided to oscillate the feed pipe 3 continuously, the bellows 2 and 5 permitting lateral movement. The pipe 3 enters the top of the reactor, having its lower reduced free end 8 projecting into bore 28 and being telescoped within pipe 9. The pipe 9 extends some distance into the reactor 6 and through a conical baffle 10 provided to divide the reactor into an $F_2$ feed or supply chamber 11 and a reaction chamber 12. The pipes 3 and 9 are sealed from communication with the atmosphere by bellows 5 which bridges the upper end or top 29 and pipe 3, permitting pipe 3 to enter through upper end or top 29 and move with respect thereto. The feed or supply chamber 11 is provided with an inlet 13 for feeding $F_2$ thereto and with outlet nozzles 14, disposed adjacent to the outlet end of the dispensing pipe 9 to bring the $F_2$ into contact with the dispersed $UF_4$. While Fig. 1 indicates that preheated $F_2$ is fed into inlet 13, it will be understood that the preheating of gaseous $F_2$ is purely optional. A gas take-off 15 is provided near the bottom of the reaction chamber 12 for the removal of $UF_6$ and excess unreacted $F_2$ from the tower, and the base of the reactor 6 is connected through any suitable valving and sealing means (not shown) to an ash receiver 16.

In the normal operation of the system of Fig. 1, the inlet of the conveyor 1 is continuously provided with finely divided $UF_4$, preferably of such consistency that 90% will pass through a 100 mesh screen, and may be preheated to a temperature of at least 200° C., if desired. However, preheating is not necessary for satisfactory reaction. The conveyor 1, as it rotates, continuously meters small quantities of $UF_4$ into the vibrated feed pipe 3, from which the powder, in a fine dispersion, drops into the dispensing portion 8. A thin, steady stream of the dispersed $UF_4$ drops from the extension 8 into the $F_2$ issuing from the nozzles 14. Preferably, the $F_2$ is preheated to about 800° F. and is provided in an excess of at least 10%–15% over the stoichiometric quantity required to convert the $UF_4$ to $UF_6$. The resulting reaction between the $UF_4$ and the $F_2$ is instantaneous, and conversion to $UF_6$ is virtually complete (approximately 99%). Throughout the process, a small quantity of air or nitrogen is admitted through the inlet 4 to prevent upflow of $F_2$ through pipes 3 and 9, thus avoiding caking of the powder therein; the air or nitrogen also promotes dispersion of the $UF_4$ powder. The $UF_6$ product, air or nitrogen, and any remaining $F_2$ are withdrawn through the outlet 15 by any suitable means, and the small amount of ash accumulating in the base of the reactor is dumped periodically into the receiver 16.

For the purpose of controlling the temperature of the reactor 6, a heat exchanger in the form of tubing 17 is coiled about the reactor. If it is desired to supply heat to the reactor, steam may be circulated through the tubing 17, but if it is desired to cool the reactor, water is employed instead of steam. When the exterior of the reactor 6 is uninsulated, the heat loss to the ambient atmosphere may be made sufficient to substantially eliminate the need for the temperature-controlling means 17. In any event, it is preferable to operate at a reactor wall temperature which is high enough to avoid the formation of intermediate products (such as $UF_5$, $U_2F_9$, and $U_4F_{17}$) and which is low enough to prevent damage to the reactor; a suitable temperature is 800° F. Tests have indicated that virtually complete conversion is ensured by preheating one or both the $UF_4$ and $F_2$ while a satisfactory conversion is obtainable without specially preheating either of the components. In various tests, satisfactory results have been obtained with a gas input ($F_2+N_2$) of 90% to 40%, mol percent $F_2$.

It has been found preferable to operate the screw conveyor 1 at an unusually high speed (preferably in the range of 60–150 R. P. M.) to minimize slugging of the powder fired. The baffling of pipe 3 also increases the dispersion of the powder therein and is essential for virtually complete conversion. Vibration of the pipe 3 is necessary for final dispersion to minimize adhesion of $UF_4$ to the reactor 6. The introduction of powder at a constant rate permits operation at a low excess of $F_2$.

In one embodiment of the apparatus of Fig. 1, it was found that 500 pounds of $UF_4$ can be processed per hour with a reactor measuring 10 feet long by 6 inches in diameter. This equals the capacity of five vibrating tray reactors, size 2 feet by 30 feet by 6 inches of the type suitable for use in the arrangements of the prior art. The $N_2$ or air bleed employed in this embodiment was approximately 0.3 C. F. M. and the $F_2$ input was approximately 8.8 C. F. M. Conversion of the $UF_4$ was 99% complete. The $UF_6$ product was virtually free of contamination.

It is apparent that the subject development is not limited to the particular apparatus shown in Fig. 1. The conveyor 1, of Fig. 1, for example, may be replaced by any one of various standard type conveyors. The modified fluorine-introducing arrangement of Fig. 2 employing a single inlet or feed pipe 13' can be employed instead of the arrangement 14 of Fig. 1 with no appreciable charge in process efficiency. Of course, it will be understood, that, for convenience, the feed pipe is omitted from Fig. 2. Satisfactory results also have been obtained by introducing the $UF_4$ and $F_2$ through concentric feed pipes passed through the top of the reactor 9. The system is adaptable to countercurrent flow, although a relatively large carry-over of solid material then may be incurred.

Having thus described our invention, we claim:

A system for reacting a solid with a gas comprising an elongated tubular reactor, a partition having walls that converge towards the interior disposed within the reactor dividing it into an upper supply chamber and a lower reaction chamber, a tube extending through the wall of the reactor at its upper extremity and through the partition to terminate in the interior of the reaction chamber to introduce a solid, means for movably joining the tube to the wall of the reactor to provide a seal, a vibrator for vibrating the tube to release the solid in a finely divided dispersed state, an inlet for supplying gas to the gas supply chamber, and openings in the converging partition for directing the gas into the interior of the reaction chamber to contact it with the dispersed solid as it falls by gravity to react them.

References Cited in the file of this patent

UNITED STATES PATENTS

| | | |
|---|---|---|
| 1,912,621 | Clark | June 6, 1933 |
| 2,048,668 | Baensch et al. | July 28, 1936 |
| 2,187,022 | Flechsig | Jan. 16, 1940 |
| 2,567,145 | Carignan | Sept. 4, 1951 |